United States Patent
Bogaki et al.

(10) Patent No.: US 6,614,646 B2
(45) Date of Patent: Sep. 2, 2003

(54) POLARIZABLE ELECTRODE FOR ELECTRICAL DOUBLE-LAYER CAPACITOR

(75) Inventors: Tomohiro Bogaki, Nagoya (JP); Masashi Ono, Nagoya (JP); Toshihiko Nakagawa, Nagoya (JP)

(73) Assignee: NKG Insulators, Ltd., Nagoya (JP)

( * ) Notice: Subject to any disclaimer, the term of this patent is extended or adjusted under 35 U.S.C. 154(b) by 0 days.

(21) Appl. No.: 10/009,665

(22) PCT Filed: Mar. 21, 2001

(86) PCT No.: PCT/JP01/02238
§ 371 (c)(1), (2), (4) Date: Nov. 13, 2001

(87) PCT Pub. No.: WO01/71739
PCT Pub. Date: Sep. 27, 2001

(65) Prior Publication Data
US 2002/0181186 A1 Dec. 5, 2002

(30) Foreign Application Priority Data
Mar. 22, 2000 (JP) ......................... 2000-080818

(51) Int. Cl.[7] .......................... H01G 9/00; C01B 31/00
(52) U.S. Cl. .................................. 361/502; 423/445 R
(58) Field of Search .................. 361/502, 503, 361/504, 505, 508–512, 516; 423/445 R

(56) References Cited

U.S. PATENT DOCUMENTS 6,335,857 B1 * 1/2002 Takimoto et al. ........... 361/502

FOREIGN PATENT DOCUMENTS

| JP | 7-44127 | 9/1990 |
| JP | 4-67610 | 3/1992 |
| JP | 11-307402 | 11/1999 |
| JP | 11-307403 | 11/1999 |
| JP | 2000-36433 | 2/2000 |
| JP | 2000-49055 | 2/2000 |
| JP | 2000-182436 | 6/2000 |
| JP | 2000-200737 | 7/2000 |

* cited by examiner

Primary Examiner—Anthony Dinkins
Assistant Examiner—Eric Thomas
(74) Attorney, Agent, or Firm—Burr & Brown

(57) ABSTRACT

A polarizable electrode for use in an electrical double layer capacitor, which includes carbon fine-powders, a conductive auxiliary agent, and a binder. The tensile strength of the polarizable electrode is not less than 0.13 MPa. An amount of carbon particles displaced from the polarizable electrodes into an electrolytic solution in the electrical double layer capacitor is not more than 1.0 mg/cm$^2$. The long-term performance degradation and self-discharge caused energy losses of the electrical double layer capacitor can be reduced.

1 Claim, 3 Drawing Sheets

POLARIZABLE ELECTRODE FOR
ELECTRICAL DOUBLE-LAYER CAPACITOR

TECHNICAL FIELD

The present invention relates to a polarizable electrode for use in electrical double layer capacitors.

BACKGROUND ART

At present, uses of electrical double layer capacitors are being actively developed in various kinds of fields from the viewpoint of their sheet-like shape.

In particular, significant reduction in the usage of fossil fuels by cars is required from environmental and resource issues. As one of the measures for such reduction, the spotlight is on so-called hybrid cars, which achieve the reduction in fossil fuel usage by the combination of fossil fuel and electricity. In this field, higher output density is demanded of a high output density type of electrical double layer capacitors.

On the other hand, use has also increased for electrical double layer capacitors employed as so-called backup power sources in personal computers and various kinds of electrical machinery and apparatuses. In this field, although a high energy density type of electrical double layer capacitors has been used, higher energy density is demanded from the electrical double layer capacitors previously used.

For these reasons, with regard to the polarizable electrodes for use in the electrical double layer capacitors, it is essential to increase the density of carbon fine-powder in the polarizable electrodes.

However, in the polarizable electrodes currently used for electrical double layer capacitors, when the polarizable electrodes are impregnated with electrolytic solutions, the carbon particles contained in the polarizable electrodes are easily displaced therefrom. Therefore, there has been a problem of degradation in the performance of the electrical double layer capacitors.

Further, because the above polarizable electrodes have many particles suspended in the electrolytic solution, there has been a problem that energy losses in the electrical double layer capacitors becomes large due to high self-discharge therein.

The present invention has been achieved in view of the fact that the conventional technologies have such problems described above. Thus, an object of the present invention is to provide a polarizable electrode for use in electrical double layer capacitors which can reduce the long-term performance degradation and self-discharge caused energy losses of prior art electrical double layer capacitors. This is accomplished by suppressing the amount of carbon particles displaced from the polarizable electrode when the polarizable electrode is impregnated with an electrolytic solution.

SUMMARY OF THE INVENTION

According to the present invention, there is provided a polarizable electrode for use in electrical double layer capacitors. The polarizable electrode includes a carbon fine-powder, a conductive auxiliary agent, and a binder. The tensile strength of the above described polarizable electrode is not less than 0.13 MPa.

According to an aspect of the present invention, the amount of carbon particles displaced from the polarizable electrodes into an electrolytic solution in the double layer capacitor is preferably not more than 1.0 mg/cm$^2$.

DETAILED DESCRIPTION OF THE INVENTION

Figure 1:
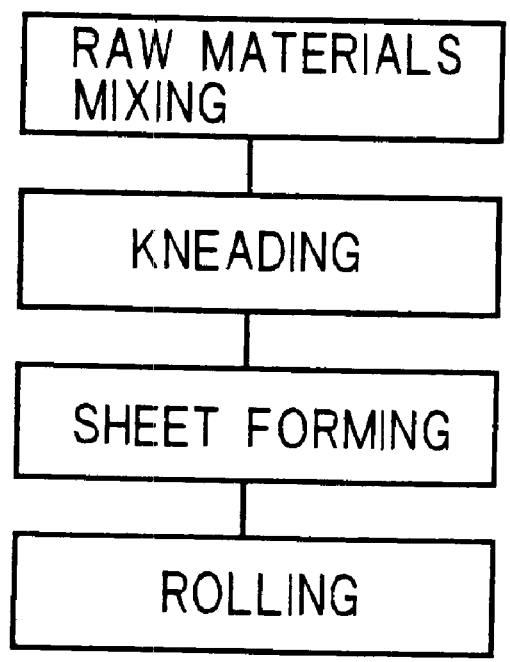
FIG. 1 shows a flow chart illustrating an example of a method of manufacturing a polarizable electrode according to the invention.

Hereinafter, the present invention will be described in detail with reference to accompanying drawings.

The polarizable electrode of the present invention is a polarizable electrode for use in electrical double layer capacitors which comprises carbon fine-powders, a conductive auxiliary agent, and a binder, and which has tensile strength of not less than 0.13 MPa.

Thereby, when the polarizable electrode is impregnated with an electrolytic solution, the carbon particles dropped from the polarizable electrode into an electrolytic solution can be suppressed. Accordingly, it is possible to reduce the long-term performance degradation and self-discharge caused energy losses of electrical double layer capacitors.

In the polarizable electrode of the present invention, the amount of dropped carbon particles displaced from the polarizable electrode into the electrolytic solution is preferably not more than 1.0 mg/cm$^2$.

If the amount of dropped carbon particles from the polarizable electrode is more than 1.0 mg/cm$^2$, the carbon particles suspended in the electrolytic solution become large in number, and therefore the self-discharge rate of the electrical double layer capacitor becomes high from a practical use standpoint, which thereby results in the degradation of the long-term performance of the electrical double layer capacitor.

Further, because the polarizable electrode of the invention can make the self-discharge rate of the electrical double layer capacitor not more than 10%, the energy losses thereof can be reduced.

In addition, the carbon fine-powder used in the invention can adsorb anions and cations existing in the electrolytic solution to form an electrical double layer, thus serving for storage of electrical power.

Further, the conductive auxiliary agent used in the invention increases the electrical conductivity between the carbon fine-powders themselves and between the carbon powders and the collector.

Therefore, the mixing ratio of the carbon fine-powders plays an important role for increasing energy density per unit area in the polarizable electrode. The mixing ratio of the conductive auxiliary agent exerts influence on the internal resistance of the polarizable electrode to contribute to improvement in the output density.

For this reason, the mixing ratio of the conductive auxiliary agent should be adjusted in accordance with the intended use of the polarizable electrode. For example, in the polarizable electrodes intended for use in applications of high energy density such as for the storage of electrical power, the mixing ratio of the conductive auxiliary agent is 3 to 10 weight parts relative to 100 weight parts of the carbon fine-powders. In the polarizable electrodes intended for use in applications of high output density such as for electric cars, the mixing ratio of the conductive auxiliary agent is preferably 8 to 20 weight parts relative to 100 weight parts of the carbon fine-powders.

As the kneaded material used in the invention, a mixture comprising a conductive auxiliary agent of 3 to 20 weight parts relative to 100 weight parts of the carbon fine-powders is suitably used. This is because, if the mixing ratio of the conductive auxiliary agent is less than 3 weight parts, the polarizable electrode has high internal resistance, thereby resulting in reduced output density.

On the other hand, if the mixing ratio of the conductive auxiliary agent is more than 20 weight parts, the internal resistance can be little decreased and the mixing ratio of the carbon fine-powder contained in unit volume decreases conversely, thereby resulting in decreased energy density.

The binder used in the invention is preferably a fluorine resin, and for example, the binder described in Japanese Patent Publication No. 7-44127 can be suitably used. That is, examples of those suitably include polytetrafluoroethylene (PTFE), ethylene-tetorafluoroethylene copolymer, ethylene-chlorotrifluoroethylene, vinyliden fluoride copolymer, tetrafluoroethylene-perphloroalkylenevinylether copolymer etc. In particular, the tetorafluoroethylene can be suitably used because it is chemically stable.

The mixing ratio of the above fluorine resin is preferably 3 to 15 weight parts (more preferably 5 to 10 weight parts) relative to 100 weight parts of carbon fine-powder.

If the fluorine resin is less than 3 weight parts, it is impossible to obtain a sheet-like compact having tensile strength of not less than 0.13 MPa.

On the other hand, if the fluorine resin is more than 15 weight parts, the internal resistance not only increases, but the ratio of the area occupied by carbon fine-powders per unit area decreases.

Next, a method of manufacturing the polarizable electrode of the present invention will be described in detail based on the drawings.

FIG. 1 is a flowchart illustrating one example of a method of manufacturing the polarizable electrode of the present invention.

As shown in FIG. 1, first, carbon powder, prepared by adding a conductive auxiliary agent of the amount of 3 to 20 weight parts to 100 weight parts of a predetermined amount of carbon fine-powder, and a binder made of a fluorine resin are mixed together such that they may be uniformly dispersed in a raw material mixture 3 (shown in FIG. 3) (raw materials mixing process). This process is performed using a kneading apparatus 10 shown in FIG. 2. The raw materials are placed in kneading apparatus 10, cover 14 is closed and the raw materials are mixed using rotors 12.

Then, in order to suppress fibrous growth of the fluorine resin, the mixing is preferably performed at temperature not higher than the transition temperature of the fluorine resin (in the case of PTFE, at 19° C. and below).

Figure 2:
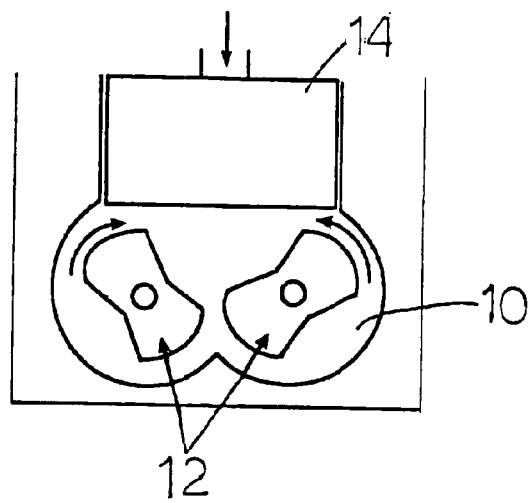
FIG. 2 shows a schematic representation of a kneader used in the present invention.
Figure 3:
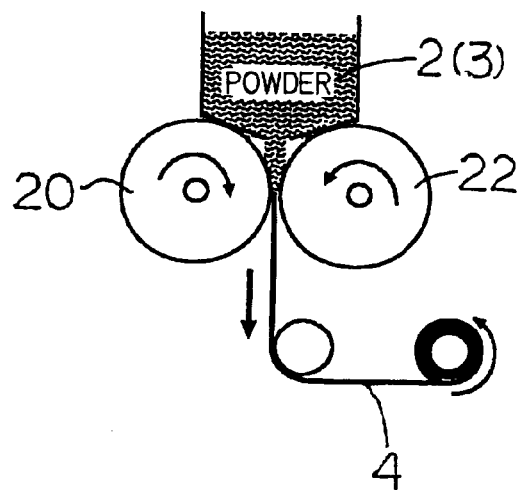
FIG. 3 shows a schematic representation of a roll-pressing machine used in the present invention.

The mixture obtained in the raw materials mixing process is sufficiently kneaded while heated at temperature between 20 and 120° C. and subjected to shearing force, for example, by means of kneading apparatus 10 shown in FIG. 2 (kneading process).

Thereby, the fluorine resin of the binder has fine fiber-like structures, which are bound to each other so as to form kneaded material 2 (shown in FIG. 3) consisting of small piece clusters having a small bulk density and apparent volume of about 0.01 to 10 cm$^3$.

In addition, the kneading temperature may be a temperature at which the fluorine resin exhibits enough flawability (for example, 50° C.), and may be sufficient up to about 120° C.

Further, the applied shearing force and the time of kneading are adequate, provided that each of the materials can be sufficiently and uniformly kneaded with each other.

Also, in the kneading process, liquid lubricant may be added in order to facilitate fibrous growth of the binder.

The kneaded material 2 obtained in the kneading process is formed into a sheet-like compact 4 of a predetermined thickness (for example, 0.3 mm), for example, by means of a roll press machine including rollers 20, 22 (sheet forming process).

At this time, the above sheet-like compact can be strengthened through partial binding between the finely fibrous structures, which have been formed of the fluorine resin, and carbon powder can be fixed more firmly.

Figure 4:
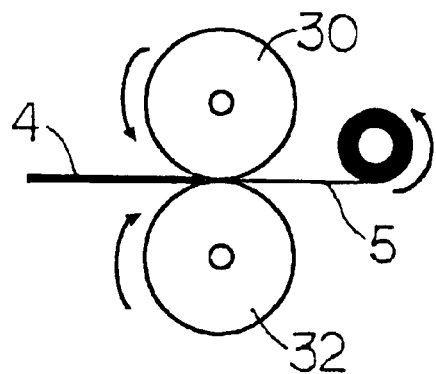
FIG. 4 shows a schematic representation of a rolling machine (reduction roller) used in the present invention.

The sheet-like compact obtained in the sheet forming process can be used as a polarizable electrode without further modification. However, when it is important to accurately control the thickness of the polarizable electrode, and when increased density is required, the sheet-like compact 4 is rolled until a predetermined thickness (for example, 0.2 mm) is reached, for example, by means of a rolling machine including reduction rollers 30, 32 (reduction roller) shown in FIG. 4. This process results in the formation of rolled polarizable-electrode sheets 5 for use in capacitors.

Finally, polarizable electrode sheets are cut to a predetermined size to produce polarizable electrodes having a desired thickness and density, for use in capacitors.

Hereinafter, the present invention will be more specifically described based on examples, but the invention should not be limited to these examples.

Further, the sheets for use in polarizable electrodes and the electrical double layer capacitors obtained in each example were evaluated in performance by the following methods.

(Method of Measuring Tensile Strength)

Tensile strength was measured in compliance with JIS K6301.

(Method of Measuring the Amount of Dropped Carbon Particles Displaced from the Polarizable Electrodes)

The polarizable-electrode sheets were stamped with a punch etc. into sheets of the shape of φ19 mm, which were dried sufficiently and then the initial weight W1 thereof was determined.

Then, after dipped in acetonitrile, the polarizable electrode sheets were taken out of the acetonitrile and dried, and then the post-impregnation weight W2 was determined.

By substituting these values into the following equation, the amount of dropped carbon particles was determined per unit surface area of each sheet, which are calculated as follows:

the amount of dropped carbon particles per unit sheet surface-area = $(W1-W2)$/sheet outer-surface-area.

(Method of Measuring Self-discharge Rate)

The electrical double layer capacitor was charged at room temperature and at a constant voltage of 2.5 V for 12 hours. Thereafter, the circuit was opened and the electrical double layer capacitor was thus left at room temperature, and then the self-discharge rate was determined from the voltage variation after 72 hours by the following equation:

self-discharge rate =100×(charging voltage−voltage after 72 hours)/charging voltage.

EXAMPLE 1

Powdered activated-carbon 80%, carbonblack 10%, and polytetrafluoroethylene (PTFE) 10% were weighed, and sufficiently mixed together with water of the same weight as the solid matter, and then kneaded at 50° C. for 10 minutes by means of a kneader. After that, the kneaded material was shaped through a roll forming machine into a polarizable electrode sheet of 150 μm thick.

The tensile strength and the amount of dropped carbon particles from the polarizable electrode were respectively measured for this sheet. The results are shown in Table 1.

Figure 5:
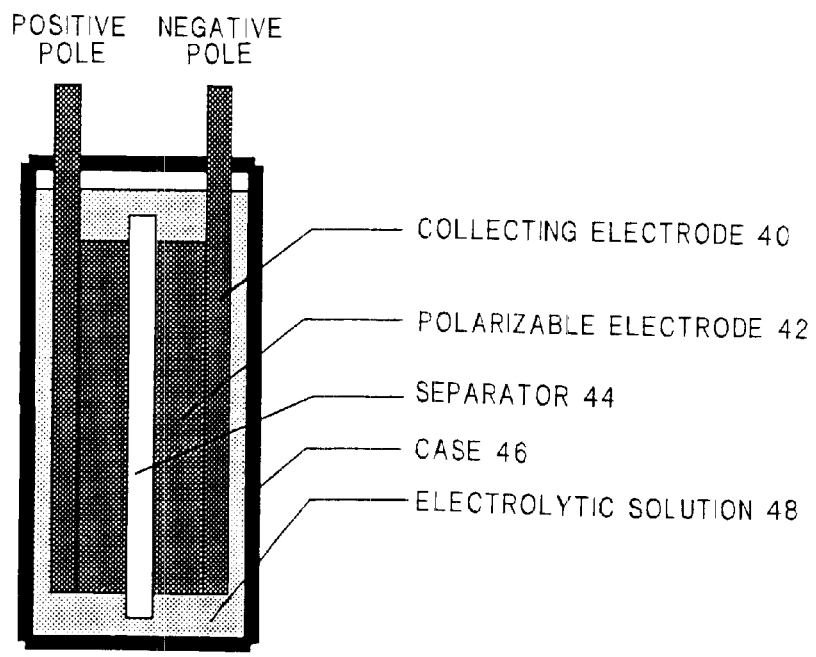
FIG. 5 shows a schematic diagram of electrical double layer capacitors used in Examples 1 to 3 and Comparative Example 1.

The above obtained sheet as a polarizable electrode 42, was brought into intimate contact with the surface of aluminum foil of a collecting electrode 40, and two sets of these were placed such that the polarizable electrodes 42 thereof could be opposed to each other. Then, a separator 44 made of cellulose was inserted between the polarizable electrodes 42, which then were impregnated with an electrolytic solution 48, which was a propylene carbonate solution of 1M boron 4-ethyl ammonium 4-fluoride. In this manner, an electrical double layer capacitor was formed and housed in case 46 (shown in FIG. 5).

Then, the self-discharge rate of the electrical double layer capacitor obtained was measured. The result is shown in Table 1.

EXAMPLE 2

Powdered activated-carbon 80%, carbonblack 10% and polytetrafluoroethylene (PTFE) 10%, each of which was the same material as used in the Example 1, were weighed and sufficiently mixed together with water of the same weight as the solid matter, and then kneaded at 50° C. for 20 minutes by means of a kneader. After that, the kneaded material was shaped through a roll forming machine into a sheet of 150 μm thick.

The tensile strength and the amount of dropped carbon particles from the polarizable electrode were respectively measured for this sheet. The results are shown in Table 1.

An electrical double layer capacitor was made of the above obtained sheet in the same manner as in the Example 1. Then, the self-discharge rate of the obtained electrical double layer capacitor was measured. The result is shown in Table 1.

EXAMPLE 3

Powdered activated-carbon 85%, carbonblack 10% and polytetrafluoroethylene (PTFE) 5%, each of which was the same material as used in the Example 1, were weighed and sufficiently mixed together with water of the same weight as the solid matter, and then kneaded at 50° C. for 20 minutes by means of a kneader. After that, the kneaded material was shaped through a roll forming machine into a sheet of 150 μm thick.

The tensile strength and the amount of dropped carbon particles from the polarizable electrode were respectively measured for this sheet. The results are shown in Table 1.

An electrical double layer capacitor was made of the above obtained sheet in the same manner as in the Example 1. Then, the self-discharge rate of the obtained electrical double layer capacitor was measured. The results is shown in Table 1.

Comparative Example 1

Powdered activated-carbon 80%, carbonblack 10% and polytetrafluoroethylene (PTFE) 10%, each of which was the same material as used in the Example 1, were weighed and sufficiently mixed together with water of the same weight as the solid matter, and then kneaded at 50° C. for 3 minutes by means of a pressure kneader. After that, the kneaded material was dried and ground, and then the ground material was shaped through a roll forming machine into a sheet of 150 μm thick.

The tensile strength and the amount of dropped carbon particles from the polarizable electrode were respectively measured for this sheet. The results are shown in Table 1.

An electrical double layer capacitor was made of the above obtained sheet in the same manner as in the Example 1. Then, the self-discharge rate of the obtained electrical double layer capacitor was measured. The result is shown in Table 1.

TABLE I

| | Tensile strength | Dropped particle amount | Self-discharge rate |
|---|---|---|---|
| Example 1 | 0.17 MPa | 0.6 mg/cm$^2$ | 8% |
| Example 2 | 0.24 MPa | 0.5 mg/cm$^2$ | 6% |
| Example 3 | 0.13 MPa | 1.0 mg/cm$^2$ | 9% |
| Comparative Example 1 | 0.11 MPa | 1.3 mg/cm$^2$ | 15% |

(Consideration: Examples 1–3, Comparative Example 1)

From the results of Table 1, in the Examples 1–3, the amount of dropped carbon particles displaced from the polarizable electrodes into the electrolytic solution can be made not more than 1.0 mg/cm$^2$. The self-discharge rate of the electrical double layer capacitors can be practically made to be not higher than 10%, by making the tensile strength of the polarizable electrodes not less than 0.13 MPa.

INDUSTRIAL APPLICABILITY

As described above, the polarizable electrode for use in electrical double layer capacitors according to the present invention allows reduction of long-term performance degradation and self-discharge caused energy losses of the electrical double layer capacitor by suppressing the amount of dropped carbon powders from the polarizable electrode when the polarizable electrode is impregnated with an electrolytic solution.

What is claimed is:

1. A polarizable electrode for use in electrical double layer capacitors, comprising: a carbon powder, a conductive auxiliary agent, and a binder, characterized in that the tensile strength of said polarizable electrode is not less than 0.13 MPa, wherein an amount of carbon particles displaced from the polarizable electrode into an electrolytic solution in the electrical double layer capacitor is not more than 1.0 mg/cm$^2$.

* * * * *